Figure 3:
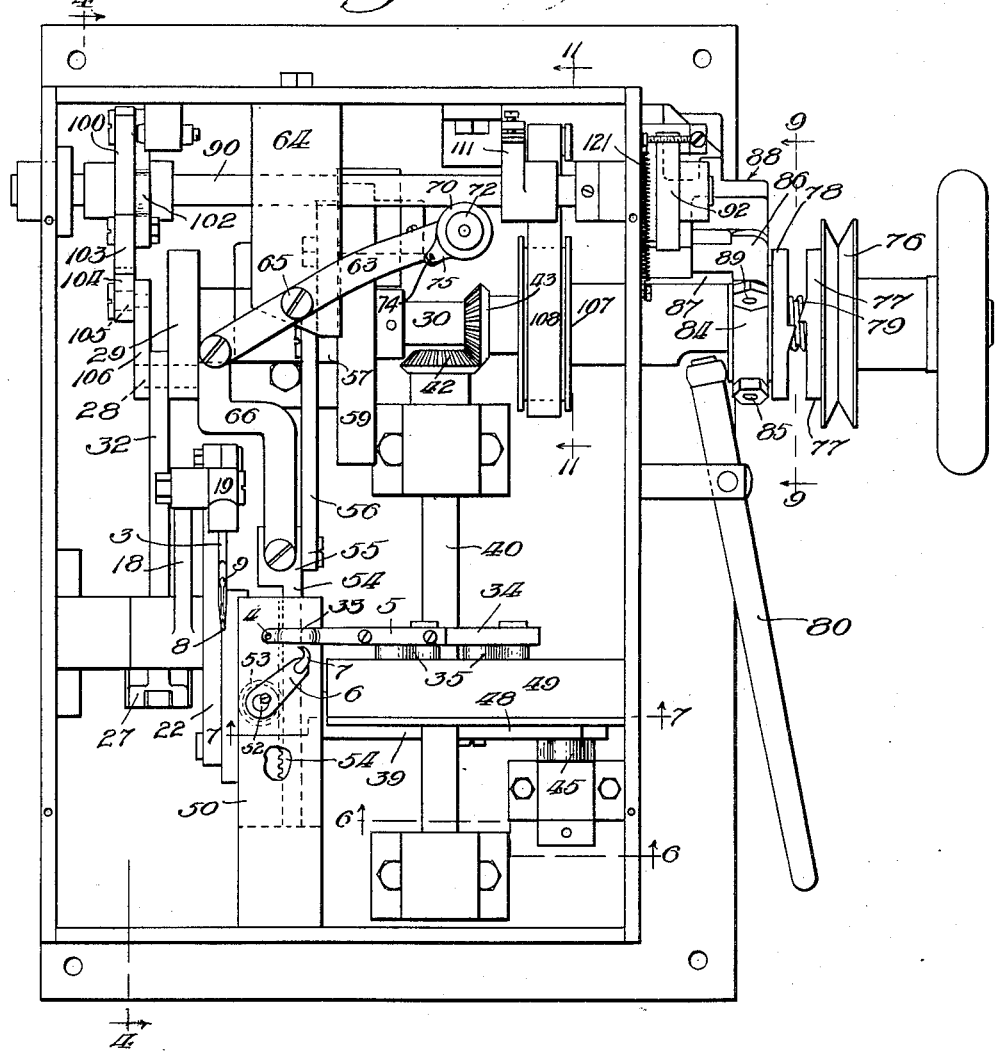

Jan. 3, 1939.　　　　L. BURDETT　　　　2,142,108
MACHINE FOR CROCHETING SHEATHINGS
Filed March 19, 1935　　　6 Sheets-Sheet 1
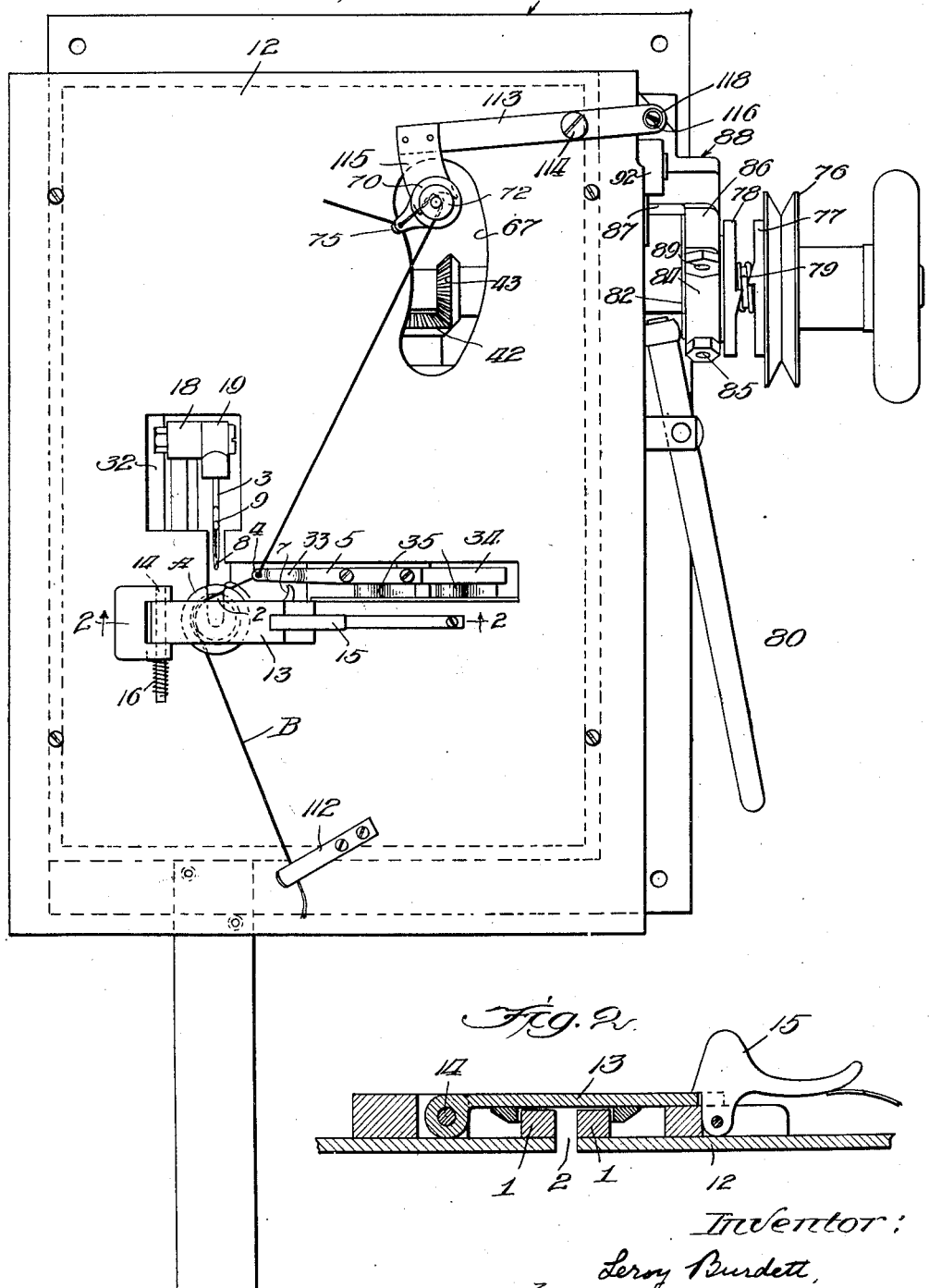
Inventor:
Leroy Burdett,
by Wm. F. Freudenreich, Atty.

Jan. 3, 1939.  L. BURDETT  2,142,108
MACHINE FOR CROCHETING SHEATHINGS
Filed March 19, 1935  6 Sheets-Sheet 2

Inventor:
Leroy Burdett,
By Wm. F. Freudenreich, Atty.

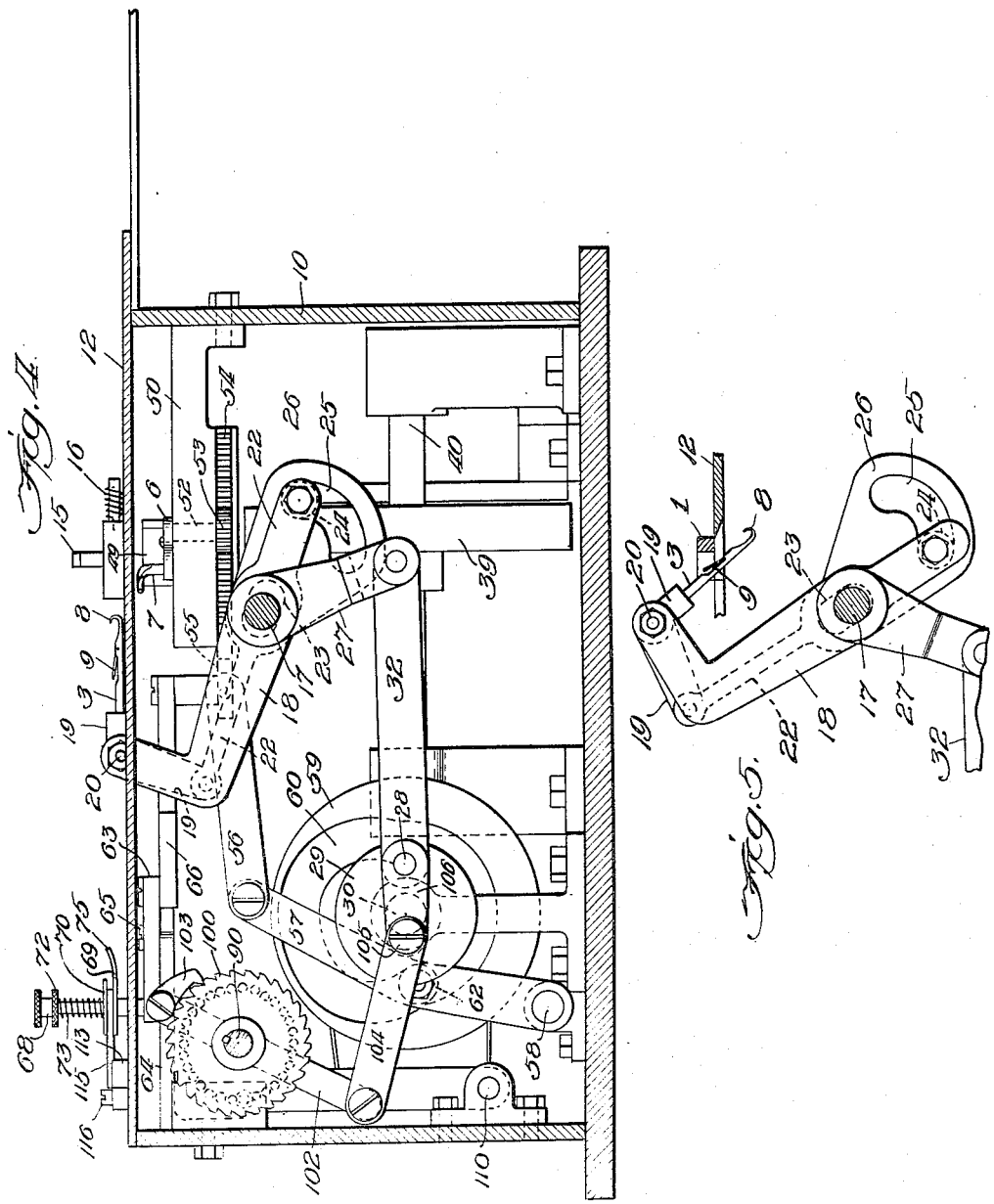

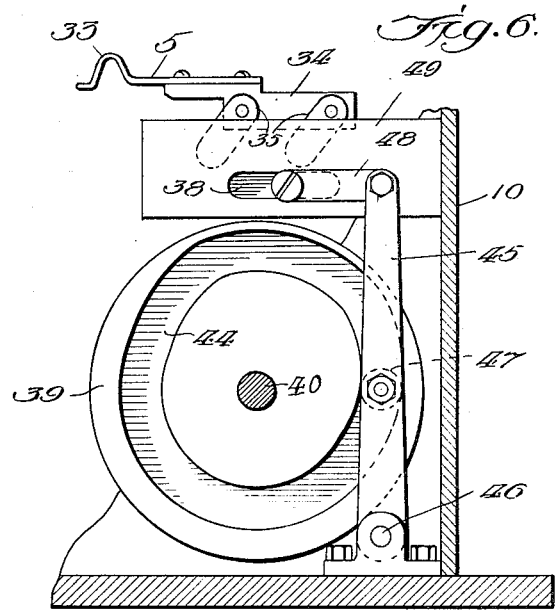
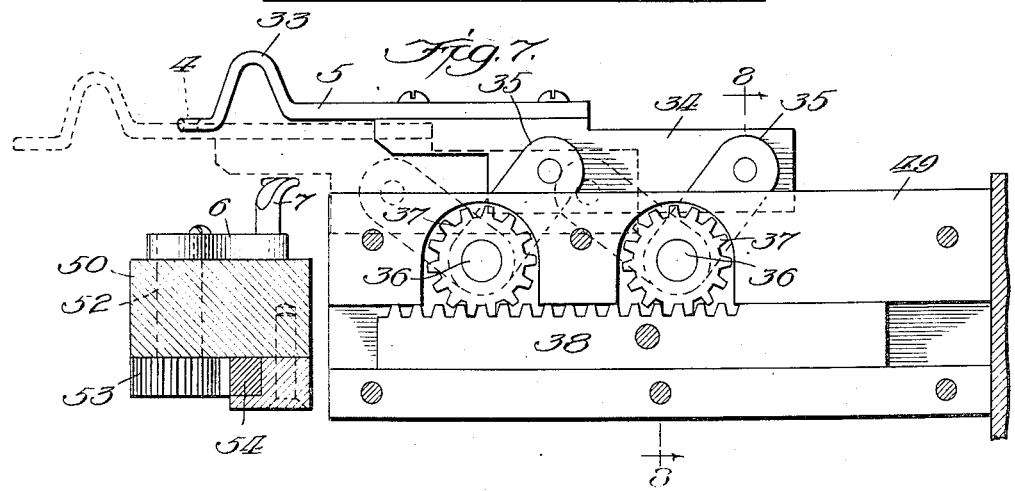
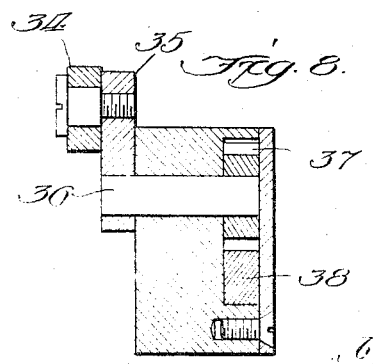

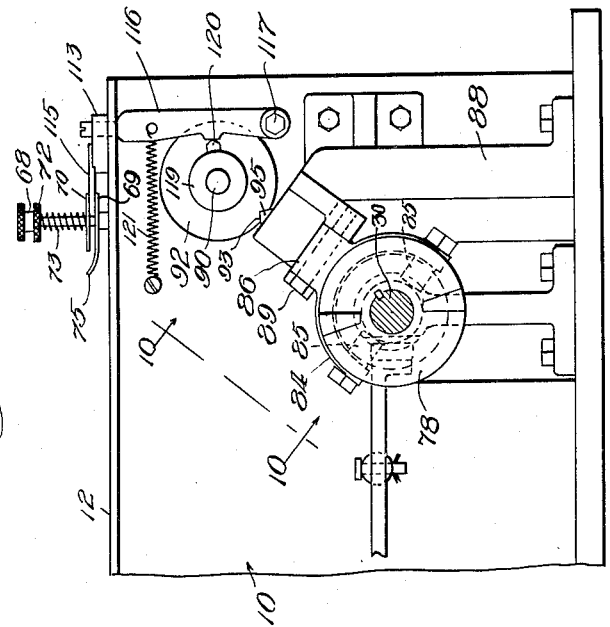
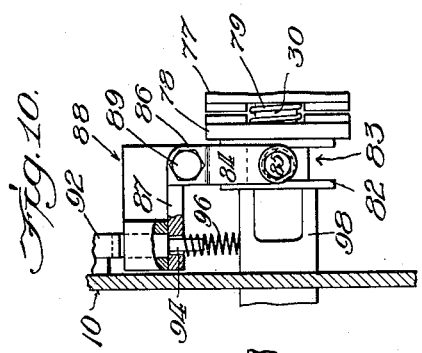
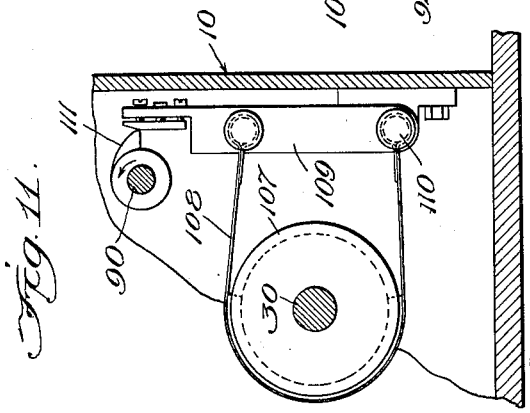

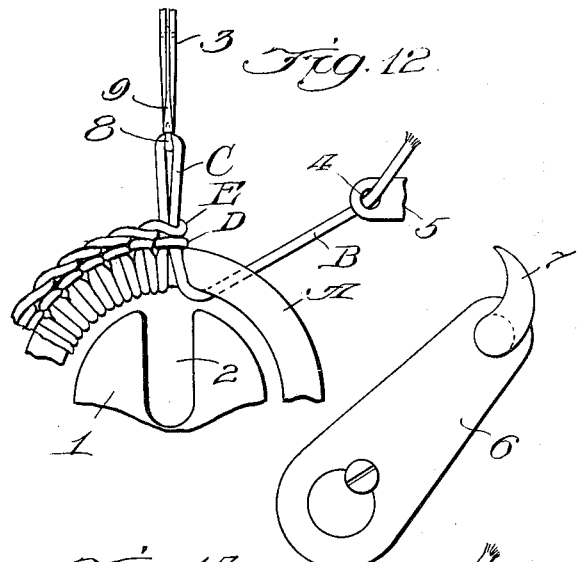
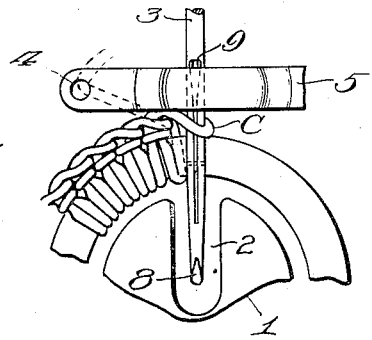
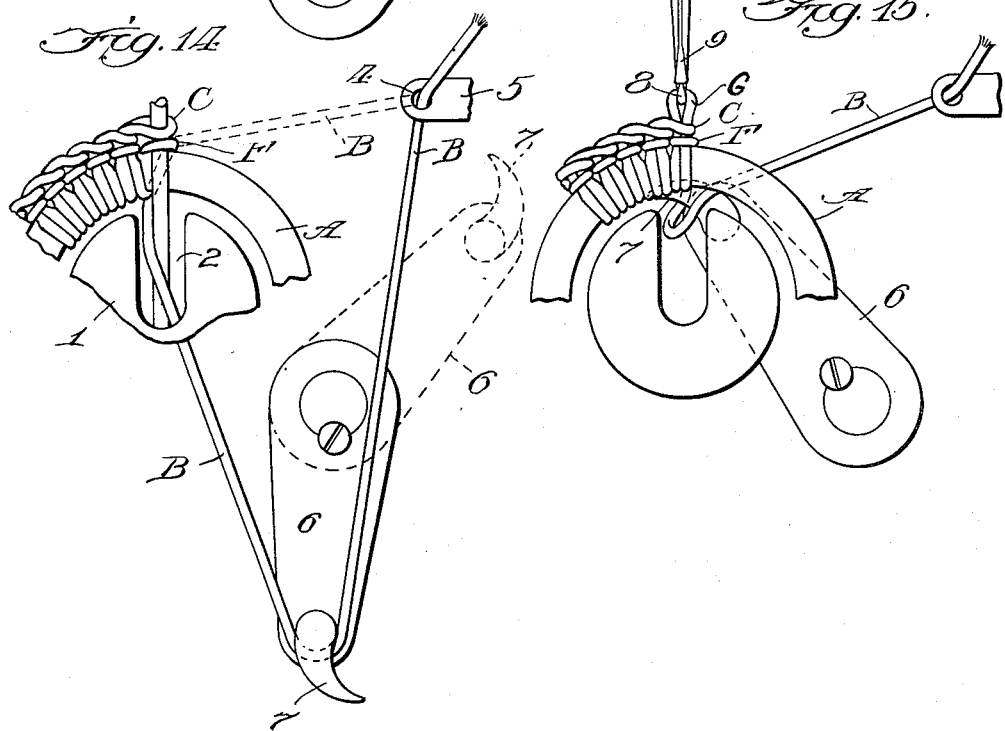
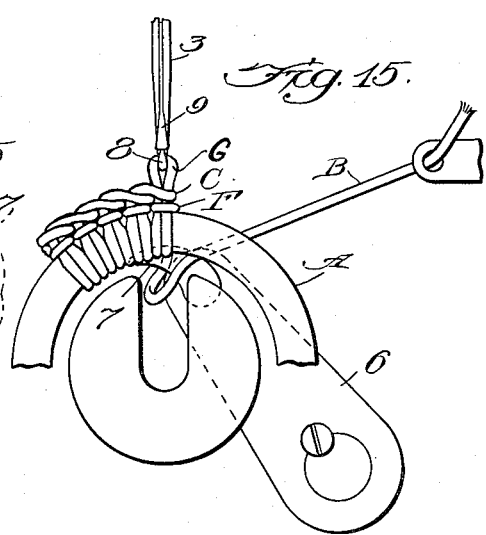

Patented Jan. 3, 1939

2,142,108

UNITED STATES PATENT OFFICE 2,142,108

MACHINE FOR CROCHETING SHEATHINGS

Leroy Burdett, Midlothian, Ill., assignor of fifty per cent to Standard Window Shade Company, Chicago, Ill., a corporation of Illinois, and one-half to I. Archer Levin, Chicago, Ill.

Application March 19, 1935, Serial No. 11,890

23 Claims. (Cl. 66—1)

The primary object of the present invention is to produce a novel, improved machine for encasing a core, particularly a ring, in a tubular crocheted sheathing.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a machine embodying the present invention; Fig. 2 is a section, on a larger scale, on line 2—2 of Fig. 1, showing only the ring holder; Fig. 3 is a view similar to Fig. 1, the top plate of the machine being omitted; Fig. 4 is a section on line 4—4 of Fig. 3 with the top plate on; Fig. 5 is a view similar to Fig. 4, showing only a fragment, with the crochet hook at the limit of its movement opposite that illustrated in Fig. 4, and a fragment of the top plate being shown in section; Fig. 6 is a section on line 6—6 of Fig. 3, but on a larger scale; Fig. 7 is a view of a smaller fragment than in Fig. 6, being a section on line 7—7 of Fig. 3, on a larger scale than Fig. 6, and showing some of the movable parts in two different positions, represented by full and dotted lines, respectively; Fig. 8 is a section on line 8—8 of Fig. 7; Fig. 9 is a section on line 9—9 of Fig. 3, being in the main a side elevation of the rear end of the machine; Fig. 10 is a section on line 10—10 of Fig. 9, showing only a fragment of the clutch mechanism; Fig. 11 is a section on line 11—11 of Fig. 3, showing only the automatic brake; and Figs. 12, 13, 14 and 15 are more or less schematic views showing various steps in the process of forming a stitch about the annular core or ring.

The machine illustrated is one adapted to sheathe a flat metal ring and the detailed description will be confined to this particular embodiment; although it will be apparent, as the description proceeds, that in its broadest aspects the invention is not limited to sheathing cores of ring shape.

The work that is done by the machine, and the manner of doing it are illustrated in Figs. 12-15. Referring to these figures, A represents a flat metal ring and B a cord leading from any suitable source of supply. The ring is placed on a suitable supporting surface on the machine having a central boss or projection 1 smaller in diameter than the ring. The projection 1 and the part that carries it have a slot 2 extending through the same radially of the projection. A crochet hook 3 is movably mounted so that it lies and moves in a vertical plane arranged radially to the projection and cutting the slot 2. In one extreme position, as shown in Fig. 12, the hook lies wholly outside of the ring and in about the plane thereof. In its other extreme position the hook extends down through the ring and the slot 2, as in Fig. 14. The cord is brought to the ring through an eye 4 in the end of an arm 5 lying and movable in a plane approximately tangential to the ring at the end of the slot 2. Underneath the plane of the support for the ring is an arm 6 adapted to oscillate in a plane parallel to the ring and having at its free end an upwardly projecting curved finger 7.

In Fig. 12 the hook is in its retracted position, outside and clear of the ring. On the hook is a loop C whose two legs pass inwardly through two loops D and E lying flat upon each other against the periphery of the ring. The left hand leg is merged in the stitches immediately to the left thereof. The right hand leg leads inwardly across the top of the ring, down through the ring and over to the eye 4 in the arm 5. While the hook is in its retracted position, the arm 5 moves toward the left, the cord sliding through the eye until there is but a very short piece of cord between the eye and the ring when the eye reaches the path of the hook. This short section of cord strikes against the loops D and E and pushes them and the ring, to which they are now fast, toward the left, as indicated in Fig. 13. Thus the loop C is laid more or less flat against the edge of the ring, and the hook is permitted to make a forward stroke down through the ring without interference on the part of the wrappings on the latter.

Cooperating with the hooked end 8 of the crochet hook is a swinging guard or gate 9. In Fig. 12 the guard is shown as swung forward until its free end overlies the hook proper 8. As the hook moves forward to the position indicated in Fig. 13 the guard is engaged with the stationary loop C and is swung back out of the way as there shown. As the crochet hook continues its forward stroke, the arm 5 is retracted until the parts are as shown in Fig. 14, with the cord stretched between the member 5 and the ring, as indicated by the dotted lines.

During the happenings thus far described the arm 6 has remained stationary. Now, however, it begins to swing counterclockwise from the position shown in full lines in Fig. 12 and in dotted lines in Fig. 14, to the full-line position in the latter figure. As the arm 6 swings in this manner, the finger 7 thereon engages the stretch of cord between the member 5 and the ring appearing in dotted lines in Fig. 14, and draws it underneath the ring, to the left of the crochet hook, and then over the top of the hook, as shown in full lines in Fig. 14. Now, when the hook proceeds on its back stroke toward the position in Fig. 12, its open, hooked end takes hold of the cord between the ring and the finger 7 and draws it upwardly and outwardly, in a doubled condition, through the prostrate loops F and C, as shown in Fig. 15. Thus a loop G, whose legs extend inwardly over the top of the ring through the loops F and C, is formed. When the open guard 9 reaches the loop F on the back stroke of the hook, it is swung down into its closing position, as shown in Fig. 15. As the crochet hook travels backward to produce the loop G the arm 6 swings in the clockwise direction, leaving the cord sufficiently slack not to place any unnecessary load on the crochet hook. In Fig. 15 the crochet hook is clear of the ring and, while the arm 6 has not yet reached its initial position as in Fig. 12, the finger 7 thereon is already free from the cord. It will be seen that the hook needs only to move back a little farther in Fig. 15, to bring about the same situation as in Fig. 12; the loops C, F and G then corresponding exactly to the respective loops E, D and C of Fig. 12 and the cycle being complete.

The cycle just described is repeated until the ring is completely sheathed, whereupon the cord is severed, the sheathed ring taken out and a bare ring inserted. In starting a sheathing, the free end of the cord is simply drawn over the ring and past the slotted side of the projection 1. The machine is then started while the extreme end of the cord is held, and the stitches immediately begin to form.

It is evident that mechanisms of many different kinds may be devised to operate the crochet hook and the members 5 and 6, or their equivalents. In the drawings I have shown only a single group of mechanisms which have been found to operate very successfully in actual practice.

So far as possible, I have housed all of the moving parts in a suitable housing or casing 10 having a detachable top 12 which constitutes the support on which the rings rest and which has thereon the projection or post 1, as can best be seen from Fig. 2. In order to prevent the ring from jumping off the post, there is provided a gate 13 overlying the post, hinged at one end to the top of the casing, as at 14, and engaged at its other end by a spring catch 15 to hold it down. A spring 16 tends constantly to swing the gate up and out of the way. Therefore, when the catch is released the gate automatically opens. Also, when the gate is closed it is automatically locked. The gate is made sufficiently narrow or is otherwise designed to avoid covering the slot 2.

The means for supporting and operating the crochet hook are best shown in Figs. 3, 4 and 5. Within the casing, below the ring position, is a transverse shaft 17 having a rigid L-shaped member 18 fixed to and projecting therefrom. Said member comprises a long radial arm extending upwardly and forwardly at the free end of the radial arm. Hinged at the angle thereof to the upper end of the member 18 is a bell crank device 19, the hinge pin being a bolt 20. One arm of the device 19 points forward and carries the crochet hook; while the free end of the other arm is pivotally connected to a strut 22 provided with an elongated slot or opening 23 through which the shaft 17 extends. On the lower end of the strut 22 is a cam roll 24 engaged in a curved cam slot 25 in a stationary plate 26. The shaft 17 has thereon a radial arm 27 whose free end is connected to a crank pin 28, on a disk 29 fixed to a horizontal driving shaft 30, by a connecting rod 32. The parts are so proportioned that during each revolution of the driving shaft, the crochet hook is moved from the position shown in Fig. 4 to that shown in Fig. 5 and back again. These are the positions corresponding to the positions of the hook in Figs. 12 and 14, respectively.

The arm 5 and its operating mechanism are best shown in Figs. 3, and 6–8. It will be seen that the arm is bent into an inverted U shape 33 near the end having therein the eye. The arm is fixed to a sturdy bar 34 which is supported on the upper ends of two rocker arms 35. The rocker arms are fixed to short horizontal shafts 36 extending longitudinally of the machine and mounted in a stationary part of the machine. Each of these shafts has thereon a pinion 37. A rack bar 38 underlies and meshes with both pinions. When the rack bar is reciprocated, the rocker arms are oscillated and the arm 5 is moved back and forth transversely of the machine and, at the same time, is raised and lowered. The parts are so proportioned that, when the arm 5 has been moved to the left as far as it will go, the inverted U-shaped part 33 lies directly over the crochet hook or, at least the path of movement of the latter and provides ample clearance for the hook. The reciprocation of the rack bar is caused by a cam in the form of a vertical disk 39 fixed to a horizontal, longitudinal auxiliary drive shaft 40. As shown in Fig. 3, the shaft 40 is driven from the main shaft 30 through similar bevel gears 42 and 43, one on each shaft and meshing with each other. The cam disk has in one face a continuous cam groove 44. A long rocker member 45 is hinged to the bottom of the casing beside the cam disk, as at 46, and extends up past the grooved side thereof. On the member 45 is a cam roll 47 engaged in the cam groove 44. A connecting rod 48 connects the upper end of the rocker 45 to the rack bar 38. Consequently, whenever the main shaft makes one revolution, the cam disk 39 is also revolved once, and the arm 5 is moved through one of its cycles. The shafts 36 and the rack bar 38 may conveniently be mounted in a suitable stationary bracket 49 fixed to a side wall of the housing or casing 10.

The oscillatory arm 6 is illustrated as being also driven from a cam. As appears in Figs. 3 and 7, the arm rests upon a bracket 50 fixed to the front wall of the casing and projecting longitudinally past the inner end of the bracket 49. The arm is fixed to the upper end of a short vertical shaft 52 that extends down through the bracket. On the lower end of the shaft is a pinion 53 that meshes with the teeth of a rack bar 54 extending longitudinally of the machine and mounted in the bracket 50 so as to be free to slide lengthwise. The inner end of the rack bar, beyond the corresponding end of the bracket 50, is enlarged into a block or head 55. As best shown in Figs. 3 and 4, one end of a connecting rod 56 is secured to this block or head. The connecting rod extends toward the rear of the machine and has its rear end secured to the upper end of a more or less upright lever 57, hinged to the base of the casing, as at 58, for swinging movements in a vertical, longitudinal plane. On the main shaft 30, beside the lever 57, is fixed a cam 59 having in the face next to the lever a continuous cam groove 60. The lever carries a cam roll 62 which is engaged in the cam groove 60. Therefore, when the main shaft revolves, the lever 57 is rocked back and forth, the lever completing a cycle of movements for each revolution of the said shaft.

In addition to the main working parts heretofore described, I have provided also means for drawing cord from a source of supply, not shown, and supplying and taking up slack, as required. This means comprises a horizontal lever 63 extending crosswise of the machine, near the rear and just below the top thereof. This lever rests upon a stationary bracket 64 fixed to the rear wall of the casing and is pivotally connected to the bracket, as indicated at 65. Between one end of the lever 63 and the head 55 on the rack bar 54 is a connecting rod 66. Therefore, as the rack bar 54 reciprocates, the lever 63 oscillates in definite time relation thereto. Rising from the other end of the lever 63, through a curved slot 67 in the top wall 12 of the casing, is a post 68. On this post, above the casing, is fixed a disk-like flange or collar 69. Slidable vertically on the post above the part 69 is a flange or collar 70 similar to the latter. Around the post, between the part 70 and a vertically-adjustable shoulder 72 at the upper end of the post is a compression spring 73. The cord to be worked up into sheathings comes from a suitable source of supply, not shown, is threaded through an eye 74 in an ear 75 on the part 69, and is wrapped partly around the post between the disks or collars 69 and 70, before being carried to the eye 4 in the arm 5. Consequently, the cord is yieldingly held by the gripping device just described and, whenever necessary, tension is thus maintained in that part of the cord extending between the gripper or tension device and the crocheting elements. When a long loop is being drawn by the swinging arm 6, as illustrated in Fig. 14, the gripper or tension device moves in synchronism with the arm 6 to supply the cord necessary to produce this long loop; and when the arm 6 makes its return stroke toward and past the position illustrated in Fig. 15, the tension device or gripper swings back and takes up the slack in the cord.

It is desirable that the machine be automatically stopped upon the completion of the sheathing of each ring. This I accomplish by employing a suitable stitch-counting means that throws out a clutch between the source of power and the main shaft whenever that number of stitches needed to cover a ring have been formed. In the arrangement shown, there is loose on the driving shaft 30, outside of the casing, a driving pulley 76. On the inner side of the pulley, and fixed thereto, is one member 77 of a clutch, whose other member 78 is slidable on the shaft from and toward the member 77, but is held against rotation on the shaft. Between the two clutch members is a compression spring 79 which tends constantly to hold them apart. The clutch member may be forced into engagement with the complementary member 77 by a hand lever 80. The sliding clutch member has a large hub 82 on the inner side and in this hub is an annular peripheral groove 83. A yoke or fork 84 straddles the hub 82 and has pins 85 entered in the groove in the latter. This yoke or fork has a short, thick stem element 86 to which is fixed an arm 87 that projects laterally, at right angles to the plane of the yoke or fork, toward the adjacent side of the casing of the machine. The yoke or fork is pivotally mounted on or hinged to a stationary post or pedestal 88, rising from the base of the machine; a large machine bolt 89 extending through the stem 87 and into the pedestal against which the stem rests. Extending across the interior of the casing near the rear and toward the top is a horizontal control shaft 90 which projects beyond the side of the casing above the clutch mechanism. On the outer end of this shaft is a disk 92 having in the periphery a V-shaped notch 93. On the free end of the arm 87 of the clutch-controlling mechanism is a pin 94 having a conical or sharpened upper end 95 adapted to be seated in the notch 93 when the two register with each other; the disk 92 and the pin being in the same plane so that normally the pin rides on the periphery of the disk. The parts are so proportioned that, when the pin is in the notch, the spring 79 forces the sliding clutch member 78 toward the left, as viewed in Figs. 3 and 10, thus throwing out the clutch. However, when the pin is out of the notch and rests upon an unmutilated part of the periphery of the disk 92, the clutch member 78 is held in interlocked relation to the complementary clutch member 77. A spring 96 may be placed between the under side of the free end of the arm 87 and a stationary hub or boss 98 on the casing and surrounding the driving shaft, this spring serving to operate the yoke or fork directly in the release of the clutch.

The shaft 90 is turned step by step, one step for each cycle of movements of the crochet hook. Therefore, if the clutch is held in by the lever 80 until the control shaft has turned through one step and carried the notch 93 to one side of the pin 94, the further turning of the control shaft will be automatic until the notch again comes opposite the pin after the desired number of stitches have been made. As best shown in Figs. 3 and 4, there is fixed to the shaft 90 a ratchet wheel 100. Beside the ratchet wheel is a pawl-carrying arm 102 loose on the shaft, this arm extending radially in opposite directions from the shaft. On one end of the arm is a pawl 103. Attached to the other end of the arm is one end of a connecting rod whose other end is secured to a crank pin 105 on the driving shaft. This crank pin may conveniently be carried on the free end of a radial arm 106 fixed to the crank pin 28 that drives the crochet hook. Thus the pawl-carrying arm is moved back and forth once during each revolution of the main shaft. A brake is preferably provided to prevent the main shaft from overrunning when the clutch is thrown out. As best shown in Figs. 3, 4 and 11, the main shaft has thereon a brake drum 107 around which a brake band 108 extends. The ends of the band are connected to a vertical lever 109, the lower connection 110 being coincident with the pivotal axis of the lever. The upper end of the lever extends past the shaft 90 which has thereon a lug 111 that engages with the lever and swings it in the direction to apply the brake at the moment the clutch is thrown out.

After the sheathing of a ring has been completed, the cord must be cut and a sufficient length must then be drawn out to permit the free end of the incoming cord to be laid over a bare ring in the holder and be carried to a little clip 112 (see Fig. 1), temporarily to secure it until the first stitch is made in the covering for the new ring. It is therefore desirable to release the grip of the tension device whenever the machine is automatically stopped. This I accomplish by means of a swinging arm or lever 113, arranged on top of the machine, near the rear, and extending transversely to and past the side on which the clutch lies. This arm or lever is pivoted between its ends, as at 114, and has at its free inner end a blade-like element 115 adapted to enter between the collars 69 and 70 and press them apart. This arm or lever is operated in proper time relation to the tension device to cause the tension-releasing blade to act on the tension device at the time the clutch is thrown out. As shown in Fig. 9, there is an upright lever or arm 116 lying behind the shaft 90 and pinned at its lower end, as at 117, to the side of the casing. The upper end of this arm or lever extends through a hole or eye 118 in the outer end of the arm or lever 113. On the disk 92, in front of the member 116, is a hub 119 having a radial projection 120 in the plane of the member 116. A spring 121 tends constantly to draw the member 116 against the hub 119 so that normally this member rides on the periphery of the hub and holds the outer end of the arm or lever 113 so far forward that the blade 115 stands clear of the tension device. The projection 120 is so placed on the hub that it engages with the upright arm or lever 116 at the same time that the notch in the disk 92 registers with the holding pin 94 for the clutch. Therefore the arm or lever 116 is swung back and the tension-relieving blade 115 is swung forward whenever the clutch is automatically released.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a machine for crocheting tubular sheathings, a reciprocable crochet hook, a holder loosely supporting an element to be sheathed below and transversely to the path of the hook, mechanism to move a cord that leaves from the under side of said element so as to carry it up in advance of a loop on the retracted hook and draw it back across the hook after the latter has advanced to said element, a device to carry the free cord under said element behind the hook and bring it forward across the top of the hook, and means to operate said hook, said mechanism and said device in proper time relation to cause said hook to crochet stitches about said element.

2. In a machine adapted to encase a ring in a tubular sheathing, a holder for loosely retaining the ring, a crochet hook, mechanism cooperating with the hook to crochet a cord about the ring, said mechanism including cord feeding means acting on said cord to turn said ring through an angular distance equal to the angular width of a stitch after the formation of each stitch, and driving means for said hook and said mechanism.

3. In a machine for crocheting tubular sheathings upon rings, a reciprocable crochet hook, a holder adapted loosely to support a ring to be sheathed below the path of the hook, mechanism to move a cord that extends from the source of supply to the under side of said ring so as to carry it up in advance of a loop on the retracted hook outwardly from said ring and draw it back across the top of the hook after the hook has moved ahead, a device to carry the free cord under said ring and across the hook on the inner side of the ring, and means to operate said hook, said mechanism and said device in proper time relation to cause said hook to crochet stitches about said ring.

4. In a machine for crocheting tubular sheathings upon rings, a reciprocable crochet hook, a holder adapted loosely to support a ring to be sheathed below the path of the hook; mechanism to move a cord that extends from a source of supply to the under side of said ring and carry the cord up on the outside of the ring in advance of and against a loop on the retracted hook and thereby feed the ring through a step equal to the angular width of a stitch and then carry the cord forward across the hook after the latter reaches the ring, a device to carry the free cord inwardly under said ring and bring it forward across the top of the hook on the inner side of the ring, and means to operate said hook, said mechanism and said device in proper time relation to cause said hook to crochet stitches and set them side by side around the ring.

5. In a machine of the character described, a holder for an element to be sheathed, a crocheting hook, mechanism cooperating with the hook to crochet a cord about said element, said mechanism including means acting on said cord to partially wind the cord around the element by forcing that part of the free cord close to said element against the endmost completed stitch on said element and by said forcing action to feed said element through a step equal to the length of a stitch after the formation of each stitch, and driving means for said hook and said mechanism.

6. In a machine adapted to encase a ring in a tubular sheathing, a holder for loosely retaining the ring, a crochet hook, means to actuate the hook so as to cause its working end to move inwardly and downwardly through the ring from a position outwardly from the periphery of the ring and then back again, mechanism cooperating with the hook to crochet a cord about the ring, said mechanism including means acting to turn said ring through an angular distance equal to the angular width of a stitch after the formation of each stitch, and driving means for said mechanism.

7. In a machine for crocheting tubular sheathings upon rings, a reciprocable crochet hook, a holder adapted loosely to support a ring to be sheathed below the path of the hook with a peripheral section and an adjacent part of the opening in the ring exposed, means to move the hook between a position in which it lies outside of the ring approximately parallel to the plane of the latter and a position in which it extends down through the said exposed part of the opening in the ring at a considerable angle to said plane, mechanism to move a cord that extends from the source of supply to the under side of said ring so as to carry it up in advance of and against the endmost completed stitch on the ring at a point between the ring and the retracted hook and then draw it back across the top of the hook after the hook has moved inwardly, a device to carry the free cord under said ring and across the hook on the inner side of the ring, and means to operate said mechanism and said device in proper time relation to each other and to the hook to cause said hook to crochet stitches about said ring.

8. In a machine of the character described, a holder for an element to be sheathed, a crocheting hook, mechanism cooperating with the hook to crochet a cord about said element, said mechanism including means acting on said cord to feed said element through a step equal to the length of a stitch after the formation of each stitch, a device including a movable gripper frictionally holding the cord and adapted to provide and again take up slack in the cord, and driving means for said hook, said mechanism and said device.

9. In a machine adapted to encase a ring in a tubular sheathing, a holder for loosely retaining the ring, a crochet hook, mechanism cooperating with the hook to crochet a cord about the ring, said mechanism including means acting to turn said ring through an angular distance equal to the angular width of a stitch after the formation of each stitch, a device including a movable gripper frictionally holding the cord and adapted to provide and again take up slack in the cord, and driving means for said hook, said mechanism and said device.

10. In a machine adapted to encase a ring in a tubular sheathing, a holder for loosely retaining a ring, a crochet hook, mechanism cooperating with said hook to work a cord into a series of crocheted stitches placed side by side around the ring, said mechanism including a movable gripper frictionally holding the cord and adapted to provide and again take up slack in the cord in the making of each stitch, driving means for said hook and said mechanism, and means to stop said driving means and open the gripper after a predetermined number of stitches have been made.

11. In a machine of the character described, a holder for an element to be sheathed, a crocheting hook, mechanism cooperating with the hook to crochet a cord about said element, said mechanism including means acting on said cord to partially wind the cord around the element by forcing that part of the free cord close to said element against the endmost completed stitch on said element and by said forcing action to feed said element through a step equal to the length of a stitch after the formation of each stitch, driving means for said hook and said mechanism, and means to stop said driving means after a predetermined number of stitches have been formed.

12. In a machine for crocheting tubular sheathings upon rings, a crochet hook, a holder adapted loosely to support a ring to be sheathed below the path of the hook with a peripheral section and an adjacent part of the opening in the ring exposed, means to move the hook between a position in which it lies outside of the ring approximately parallel to the plane of the latter and a position in which it extends down through the said exposed part of the opening in the ring at a considerable angle to said plane, an element having therein an eye for the passage of a cord to be crocheted, means to move said element so as to carry said eye across the path of the hook from and toward the ring in a plane approximately tangential to the ring, a device to engage the cord at a point between said eye and the ring and carry it under said ring and across the top of the hook on the inner side of the ring, and means to operate said element and said device in proper time relation to each other and to the hook to cause said hook to crochet stitches about said ring.

13. In a machine for crocheting tubular sheathings upon rings, a holder adapted loosely to support a ring to be sheathed, a crochet hook movable between a position outwardly from and radial to a ring in the holder and a position in which it extends down through the ring, a member adapted to engage with a cord that extends from a source of supply to the under side of said ring and carry the cord up on the outside of the ring in advance of and against the last completed stitch on the ring while the hook is retracted and thereby feed the ring through a step equal to the angular width of a stitch and then carry the cord across the top of the hook after the latter reaches the ring, an oscillatory device lying below the holder and adapted to engage the cord at a point between said member and the ring and carry the cord inwardly under said ring and then forward across the top of the hook on the inner side of the ring, and means to operate said hook, said member and said device in proper time relation to cause said hook to crochet stitches and set them side by side around the ring.

14. In a machine adapted to encase a ring in a tubular sheathing, a holder for loosely retaining the ring, a crochet hook, mechanism cooperating with the hook to crochet a cord about the ring, said mechanism including means forcing said cord towards the last previously completed crocheted stitch and forcing said cord to turn said ring positively through an angular distance equal to the angular width of a sitch after the formation of each stitch, and driving means for said hook and said mechanism.

15. A machine of the character described, comprising means for supporting an element to be sheathed in the same plane throughout the sheathing thereof, a crocheting hook, mechanism cooperating with the hook to crochet a cord about said element, said mechanism including means for feeding said element through a step equal to the angular width of a stitch after the formation of each stitch, and driving means for said hook and mechanism.

16. A machine of the class described, comprising means for supporting an element to be sheathed in the same plane throughout the sheathing thereof, a crocheting hook, mechanism cooperating with the hook to crochet a cord about said element, said mechanism including cord feeding means for feeding said element through a step equal to the angular width of a stitch after the formation of each stitch, and driving means for said hook and mechanism.

17. A machine of the character described, comprising means for supporting an element to be sheathed in the same plane throughout the sheathing thereof, a crocheting hook, mechanism cooperating with the hook to crochet a cord about said element, said mechanism including means acting on said cord to feed said element through a step equal to the angular width of a stitch after the formation of each stitch, and driving means for said hook and mechanism.

18. A machine of the class described, comprising means for supporting an element to be sheathed in the same plane throughout the sheathing thereof, a crocheting hook, mechanism cooperating with the hook to crochet a cord about said element, said mechanism including cord feeding means for acting on said cord to feed said element through a step equal to the angular width of a stitch after the formation of each stitch, and driving means for said hook and mechanism.

19. A machine of the character described, comprising means for supporting an element to be sheathed in the same plane throughout the sheathing thereof, a crocheting hook, mechanism cooperating with the hook to crochet a cord about said element, said mechanism including means acting on said cord to force that part of the free cord close to said element against the endmost completed stitch on said element and feed said element through a step equal to the angular width of a stitch after the formation of each stitch, and driving means for said hook and mechanism.

20. A machine of the character described, comprising means for supporting an element to be sheathed in the same plane throughout the sheathing thereof, a crocheting hook, mechanism cooperating with the hook to crochet a cord about said element, said mechanism including cord feeding means acting on said cord to force that part of the free cord close to said element against the endmost completed stitch on said element and feed said element through a step equal to the angular width of a stitch after the formation of each stitch, and driving means for said hook and mechanism.

21. A machine of the character described, comprising a support for an element to be sheathed, a crocheting hood, mechanism cooperating with said hook to crochet a cord about said element, and means for driving said hook and mechanism, said hook and mechanism being so correlated that said hook completes its cycle in two strokes in the formation of one crochet stitch.

22. A machine of the character described, comprising a support for an element to be sheathed, a crocheting hook, mechanism cooperating with said hook to crochet a cord about said element, means for driving said hook and mechanism, said hook and mechanism being so correlated that said hook completes its cycle in two strokes in the formation of one crochet stitch and means for relatively shifting said element and hook, after the completion of each stitch, to present an unstitched part of the element in juxtaposition to said hook.

23. A machine of the character described, comprising means for supporting an element to be sheathed in the same plane throughout the sheathing thereof, a crocheting hook, mechanism cooperating with said hook to crochet a cord about said element, and means for driving said hook and mechanism, said hook and mechanism being so correlated that said hook completes its cycle in two strokes in the formation of one crochet stitch.

LEROY BURDETT.